April 6, 1937.  O. ROLLS  2,076,095
DEVICE FOR OBSERVING THE OPERATION OF PRESS ROLLS
Filed Sept. 9, 1933
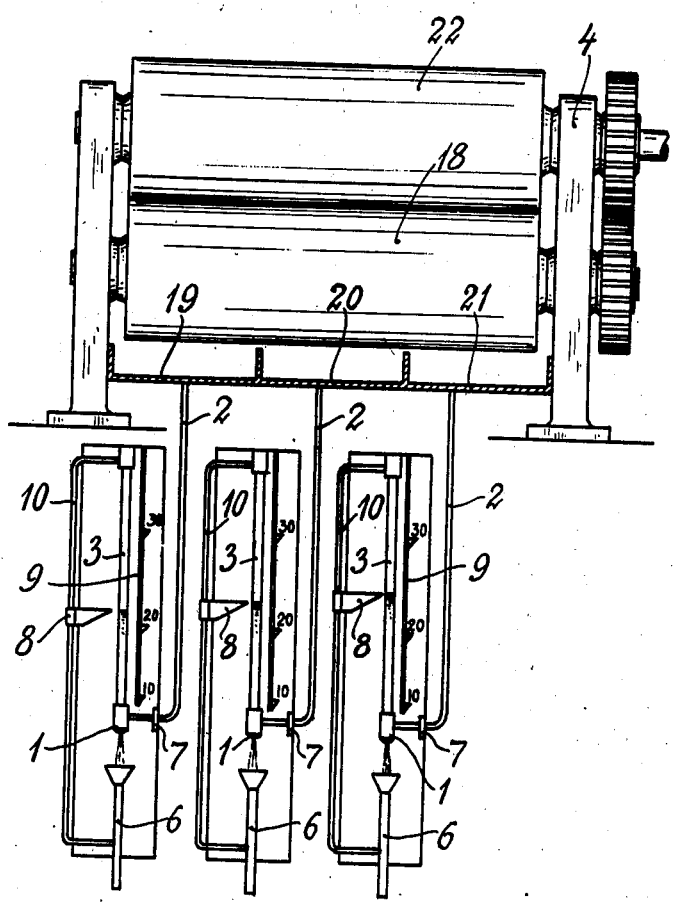
Inventor
Oscar Rolls
by B. Singer
his Attorney Patented Apr. 6, 1937

2,076,095

UNITED STATES PATENT OFFICE 2,076,095

DEVICE FOR OBSERVING THE OPERATION OF PRESS ROLLS

Oscar Rolls, Honefoss, Norway

Application September 9, 1933, Serial No. 688,832
In Norway July 20, 1929

3 Claims. (Cl. 92—49)

There are many cases, wherein it is necessary to know, how much of a liquid flows out from an apparatus or the like each unit of time. Further it is frequently required to regulate the quantity of liquid which each unit of time is conducted to a certain place. As an example may be mentioned a continuous addition of alum, glue and dyestuffs or bleaching agent to the pulp in paper making factories. In this case an exactly determined quantity is required each unit of time, in order to obtain the correct composition of the pulp.

The present invention relates to a device to be arranged below a water extracting press to control the operation of the press which may be for example a press used in paper making factories to remove water from a travelling continuous paper web. According to the invention a water collecting vessel is arranged below said press and is divided into a plurality of independent sections each receiving the water from that portion of the press immediately above the same. With each section I associate an apparatus measuring the quantity of water collected by each section in each unit of time. The measuring apparatus may be of a suitable kind as further described hereinafter.

An embodiment of the invention is illustrated by way of example in the accompanying drawing.

The Fig. 1 illustrates diagrammatically a number of measuring devices as applied to the various sections of a water collecting vessel of a press.

In the drawing 4 denotes the press proper having an upper roller 22 and a lower roller 18.

The water pressed out is collected in three separated vessels 19, 20, 21, each of which is connected with a separate supply pipe 2. The indications of the several measuring apparatuses show if the pressed-out quantities are the same one in all thirds of the roller length or if they be different and require an adjustment of the upper roller 22 in relation to roller 18 to obtain even pressure action on the entire roller length.

In each measuring apparatus the outflow nozzle 1 of the liquid communicates partly with a supply pipe 2 for liquid under a substantially constant head and partly with an upwardly open ascension-pipe 3. Consequently the head of liquid for the nozzle 1 remains very nearly constant, while the liquid flows out in the subjacent pipe 6 or into a vessel. According to the outflow resistance of the nozzle and to the resistance in the supply 2 (thus the frictional resistance, bend resistances, cock resistances etc.) a quite definite head equal to $$k \cdot \frac{v^2}{2_g}$$

will apply at the outlet, $v$ being the outflow velocity, $g$ the acceleration of gravity and $k$ a constant factor depending upon specific gravity, viscosity, contraction and resistance of the liquid. This head will adjust itself in the ascension-pipe 3, the liquid taking in same a definite level height corresponding thereto and remaining at this level unaltered, as long as the liquid flows out under unaltered conditions. The height of the level consequently is an indication for the outflowing quantity. Therefore the quantity of liquid flowing out each second is measured and the result namely the measured quantity, is written on a mark which has been made at the height to which the liquid in the ascension pipe 3 has risen during the outflow of this particular quantity.

If now the passage member or cock 7 of pipe 2 is throttled, the outflowing quantity of liquid will be less, because the effective head is reduced. The liquid in pipe 3 now will ascend to a less height which is again quite definite and yields an indication of the said quantity. If same is measured directly, a new mark and inscription may be made at the said level height. In this manner the pipe 3 may be provided with a graduation indicating the outflowing quantity. This graduation is nothing but a simple quadratic graduation, because the variable $v$ occurs in the second power in the formula of the head $$k \cdot \frac{v^2}{2_g}$$

After the graduation has been completed (the apparatus calibrated), the apparatus may be easily adjusted for a desired outflowing quantity. For instance, in case it is desired to obtain an outflowing quantity of 23 liters an hour, the adjustable index 8 is set at the point of the graduation indicating that quantity. Then the cock 7 is adjusted until it is seen that the liquid in the pipe 3 takes the level height of the index.

In case the nozzle 1 is choked up the liquid may take its way through an overflow-pipe 10 arranged on the pipe 3 and preferably connected to the pipe 6. The index 8 may be mounted slidably on the pipe 10.

Obviously the graduation 9 will be correct only for a certain liquid, because the outflow velocity depends upon its specific gravity and partly also upon its viscosity etc., one for each of the liquids of interest. However, it will always be necessary to shift the nozzle 1 in combination with the appertaining graduation 9. For instance, if the liquid, for a definite outflowing quantity through the cock 7, takes a high level in the pipe 3 (said pipe being of a limited length) and the apparatus is now to be adjusted for a considerably higher outflowing quantity by opening the cock 7 correspondingly, the pipe 3 will not suffice in length. In such case it is necessary to use a coarser nozzle 1 with appertaining graduations of such a size that the liquid will not reach to the top within the pipe 3. Any shifting of measuring graduations and nozzle may be effected without any necessity of emptying the apparatus or putting it out of operation, the removal of the nozzle 1 having no influence upon the quantity of liquid passing out through the cock 7 each unit of time.

When using the apparatus according to this invention for measuring how much liquid is delivered each second by the several sections the cock 7 is removed. The liquid then takes such a position in pipe 3 that the head above the nozzle 1 is sufficient to press out through same just the produced quantity of liquid. In pipe 3 is therefore an indication of the quantity delivered each second.

I claim:

1. In combination with a water extracting press, of a water collecting vessel arranged below said press and divided into a plurality of independent sections each receiving the water from that portion of the press immediately above the same, and means associated with each section for continuously measuring the quantity of water collected by each section in each unit of time.

2. In combination with a water extracting press, of a water collecting vessel arranged below said press and divided into a plurality of independent sections each receiving the water from that portion of the press immediately above the same, and means associated with each section for continuously measuring the quantity of water collected by each section, each measuring means comprising a vertical ascension pipe open at its upper end a vertically downwardly extending water discharge pipe connected at its lower end with the lower end of said vertical ascension pipe which is open at its upper end, said discharge pipe being connected at its upper end with its associated collecting section and a discharge nozzle at the lower end of said ascension pipe, the liquid level in said ascension pipe indicating the quantity of water passing through each nozzle in each unit of time.

3. In combination with a water extracting press, of a water collecting vessel arranged below said press and divided into a plurality of independent sections each receiving the water from that portion of the press immediately above the same, means for continuously discharging the collected water from each section, and means associated with each section discharge means for continuously measuring the quantity of water collected by each section, said measuring means visibly indicating the quantity of water collected in each unit of time when the water is discharged from said section.

OSCAR ROLLS.